United States Patent [19]

Leuthold

[11] 3,904,965

[45] Sept. 9, 1975

[54] ARRANGEMENT FOR INFORMATION TRANSMISSION

[75] Inventor: Peter Eugen Leuthold, Erlenbach, Switzerland

[73] Assignee: U.S. Philips Corporation, New York, N.Y.

[22] Filed: Sept. 19, 1973

[21] Appl. No.: 398,586

[30] Foreign Application Priority Data

Oct. 3, 1972 Netherlands ...................... 7213335

[52] U.S. Cl. ............... 325/141; 325/42; 307/221 R; 235/197

[51] Int. Cl.$^2$ ...................... H04B 1/04; G06F 15/34

[58] Field of Search ......... 325/38, 41, 42, 137, 138, 325/141, 163; 178/66 R, 68 R; 307/221 R, 269, 271; 235/152, 197

[56] References Cited

UNITED STATES PATENTS

| | | | |
|---|---|---|---|
| 3,611,143 | 10/1971 | Van Gerwen | 325/141 X |
| 3,624,427 | 11/1971 | Dijkmans | 325/137 X |
| 3,665,314 | 5/1972 | Leuthold | 325/137 X |
| 3,793,588 | 2/1974 | Gerwen et al. | 178/68 X |

*Primary Examiner*—Robert L. Griffin
*Assistant Examiner*—Aristotelis M. Psitos
*Attorney, Agent, or Firm*—Frank R. Trifari; Simon L. Cohen

[57] ABSTRACT

In an information transmission system a shift register controlled modulator matrix is employed for simultaneously performing a modulating and a filtering process to reduce unwanted modulation products and harmonics. By employing a shift register controlled modulator matrix with a shift register having an input combination device coupled to an information source and through weighting devices to elements of this shift register, the size of the modulator matrix is reduced.

4 Claims, 5 Drawing Figures

ARRANGEMENT FOR INFORMATION TRANSMISSION

The invention relates to an arrangement for information transmission provided with a first shift register connected to a first signal source and having a plurality of shift register elements whose contents are shifted at the frequency of a first control generator, and a second shift register connected to a second signal source and having a plurality of shift register elements whose contents are shifted at the frequency of a second control generator, said arrangement furthermore including a matrix network whose nodes incorporate modulation elements whose input circuits are connected to both the shift register elements of the first shaft register and to those of the second shift register and whose output circuits are connected to weighting devices. The output signal from the arrangement is derived from a combination device connected to all weighting devices.

As already extensively described in Netherlands Patent application 70.12386, such an arrangement is generally used when a transmitter must simultaneously perform a given modulation process and a given filtering process. Particularly, by suitable choice of the transfer coefficients of the weighting networks, optionally together with a suitable choice of the type of modulation elements, an arbitrary transmission mode characterized by modulation method and filter characteristic can be performed such as, for example amplitude modulation, phase modulation, frequency modulation or orthogonal modulation using, for example, double sideband transmission, vestigial sideband transmission, or single sideband transmission. The different types of digital modulation elements such as, for example, AND gates or Exclusive-OR gates (modulo-2-adders) may be used as modulation elements, but the more conventional analog modulation elements such as, for example, amplitude modulators or product modulators may alternatively be used. In addition to the advantages of universality and a greater freedom in the choice of the frequencies of the signal sources, such an arrangement has the remarkable advantage that unwanted modulation products and harmonics of signal frequencies in or in the vicinity of the frequency band to be transmitted are reduced to a great extent. In addition, this arrangement is suitable for complete integration in a semiconductor body.

In special circumstances, especially when special requirements are imposed on the filter characteristic such as, for example, very steep attenuation slopes or special zeros in the transmission band for the purpose of transmitting pilot signals, the matrix network of modulation elements is found to be very bulky in practice.

In an arrangement of the kind described in the preamble in which a filtering process is performed simultaneously with a modulation process, it is an object of the invention to reduce the size of the matrix network of modulation elements to a considerable extent, while maintaining the abovementioned advantages.

The arrangement according to the invention is characterized in that it includes at least one shift register having a plurality of shift register elements and a combination device located on its input side which is fed on the one hand by a signal derived from the first signal source and, on the other hand, by the output signals from weighting devices connected to the elements of the latter shift register, the contents of the elements of the latter shift register being shifted at a frequency which is equal to an integral number of times the frequency of the first control generator, the elements of the latter shift register as well as those of the second shift register being connected to input circuits of modulation elements incorporated in nodes of a matrix network, the output circuits of said elements being connected to weighting devices, while the different weighting devices incorporated in a matrix network are connected to a combination device whose output constitutes the output of the arrangement.

The invention and its advantages will now be described in greater detail with reference to the embodiments shown in the following Figures.

Figure 1:
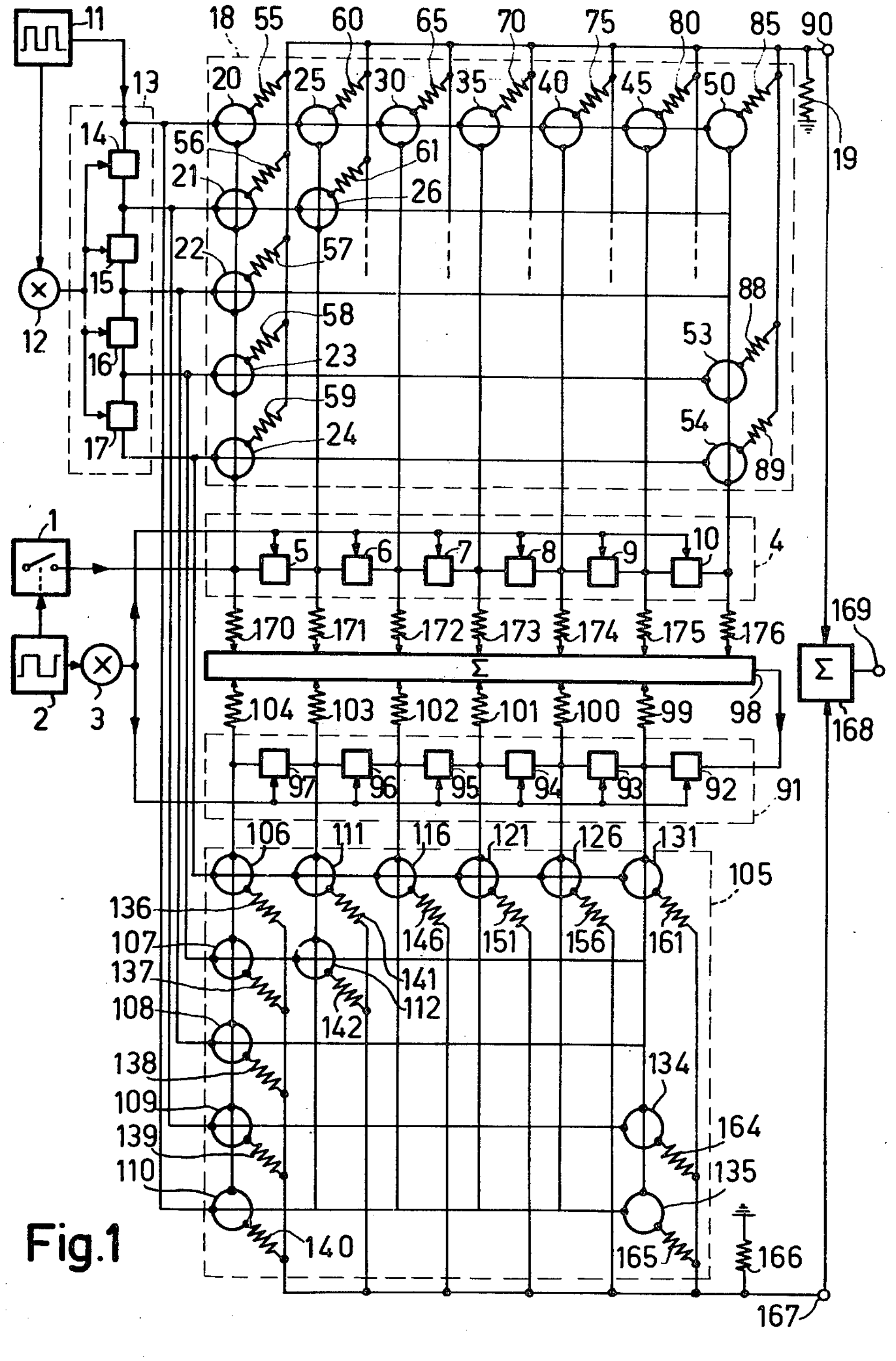
FIG. 1 shows an arrangement according to the invention constructed as an amplitude modulator in a transmission system for binary synchronous information pulses.

FIG. 1 shows a modulator of a transmission system for binary synchronous information pulses. The frequency band to be used lies, for example, between 300 and 3300 Hz, while the transmission speed is, for example, 1200 Baud. The instants of occurrence of the binary information pulses originating from a first signal source 1 coincide with the pulses of a series of equidistant clock pulses supplied by a clock pulse generator 2 having a clock frequency $f_T$ of, for example, 1200 Hz. The information pulses are applied to a first shift register 4 having a plurality of shift register elements 5, 6, 7, 8, 9, 10, whose contents are shifted at a shift frequency $f_T$ equal to an integral multiple of the clock frequency $f_T$; the shift frequency $f_T$ is, for example, twice the clock frequency $f_T$ and equals 2400 Hz. This shift frequency $f_T$ is generated with the aid of a first control generator 3 coupled to the clock pulse generator 2 and formed as a frequency multiplier.

The second signal source is constituted by a carrier pulse generator 11 supplying a series of carrier pulses having a carrier pulse frequency $f_c$ of, for example, 1800 Hz. These carrier pulses are likewise applied to a second shift register 13 having a plurality of shift register elements 14, 15, 16, 17, whose contents are shifted at a shift frequency $f_\delta$ equal to an integral multiple of the carrier frequency $f_c$. The shift frequency $f_\delta$ is, for example, 10 times the carrier frequency $f_c$ and equals 18 kHz. This shift frequency $f_\delta$ is likewise generated with the aid of a second control generator 12 coupled to carrier pulse generator 11 and formed as a frequency multiplier.

To modulate the information pulses from signal source 1 on the carroer pulses from signal source 11 and to obtain a desired filter characteristic, the output circuits of the shift register elements of the two shift registers 4 and 13 are connected to a matrix network 18, the nodes of these output circuits including modulation elements 20, 21, - - - 53, 54 in the form of, for example, AND gates. A logical combination of the binary pulses stored in the two shift registers 4, 13 is established in the modulation elements 20–54, while the output signals from the modulation elements 20–54 are weighted with the aid of weighting devices constituted, for example, by suitably proportioned attenuation networks 55, 56, . . . 88, 89 and a combination device 19. The output signal of the transmission arrangement then occurs at an output 90 of combination device 19.

The character of the output signal from the transmission arrangement depends on the choice of the weighting devices. The transfer coefficient $C\,\nu\,\mu$ from the output of a modulation element to output 90 of combination device 19 is determined by the attenuation network connected to the modulation element and the network 19 operating as a combination device, where $\nu$ denotes a shift register element of shift register 4 reckoned from the center of shift register 4 and with opposite sign on either side of this center, while likewise $\mu$ denotes a shift register element of shift register 13 reckoned from the center of shift register 13 and with opposite sign on either side of this center. For example, the transfer coefficient from modulation element 26 to output 90 (determined by networks 61 and 19) is denoted by $C_{-2-1}$, from modulation element 40 to output 90 by $C_{+1-2}$, from modulation element 50 to output 90 by $C_{+3-2}$, and so on.

By suitable choice of these transfer coefficients and optionally the type of modulation elements, an output signal modulated and filtered in the desired manner is derived from the transmission arrangement, while also unwanted modulation products and harmonics of signal frequencies in and in the vicinity of the transmission band are suppressed to a large extent. In addition the described arrangement can be dealt with mathematically in a simple and convenient manner as has extensively been described in the previously mentioned patent application.

In conformity with the explanation given in this patent application, it is assumed also in this case that a signal $f_1(t)$ is applied to the shift register 4 having shift register elements $\nu$ enumerated $-n$ to $n$ and having a shift period of $T_1 = 1/f_T$, and that a signal $f_2(t)$ is applied to shift register 13 having shift register elements $\mu$ enumerated $-m$ to $m$ and having a shift period of $T_2 = 1/f_\delta$. Since the functions $f_1(t)$ and $f_2(t)$ are not known for negative values of time, fictitious zero points in the past are determined which coincide with the centers of the shift registers 4 and 13. Thus, a general signal delay is introduced which, however, does not play any role in transmission systems. For the output signal $F(t)$ at output 90 of combination device 19, the following expression is then obtained.

$$F(t) = \sum_{\nu=-n}^{n} \sum_{\mu=-m}^{m} C\nu\mu\, f_1(t-\nu T_1) f_2(t-\mu T_2) \quad (1)$$

To better understand the modulation process in the described arrangement, equation (1) is subjected to a Fourier transformation:

$$\phi(\omega) = \frac{1}{2\pi} \sum_{\nu=-n}^{n} \sum_{\mu=-m}^{m} C\nu\mu \exp(-j\nu T_1\omega) F_1(\omega) \times \exp(-j\mu T_2\omega) F_2(\omega) \quad (2)$$

In this formula, $\phi(\omega)$, $F_1(\omega)$ and $F_2(\omega)$ indicate the Fourier transformations of the functions $F(t)$, $f_1(t)$ and $f_2(t)$ while the symbol * denotes the convolution operation. This equation may be written as:

$$\phi(\omega) = \frac{1}{2\pi} \sum_{\nu=-n}^{n} \alpha_\nu \exp(-j\nu T_1\omega) F_1(\omega) \times \sum_{\mu-m}^{m} a\mu \exp(-j\mu T_2\omega) F_2(\omega) \quad (3)$$

with the relation $$C\,\nu\,\mu = \alpha_\nu \quad a_\mu \quad (4)$$

between the coefficients, $\alpha_\nu$ and $a_\mu$ representing the coefficients of the Fourier expansions of the transfer functions $H_1(\omega)$ and $H_2(\omega)$ which must be realised for the signal $F_1(\omega)$ and the signal $F_2(\omega)$, respectively. The periodicity of these Fourier series $\tilde{H}_1(\omega)$ and $\tilde{H}_2(\omega)$ is given by the radial frequencies $\omega_T = 2\pi/T_1 = 2\pi f_T$ and $\omega_\delta = 2\pi/T_2 = 2\pi f_\delta$. As a result, equation (3) may alternatively be written as:

$$\phi(\omega) = \frac{1}{2\pi} \tilde{H}_1(\omega) F_1(\omega) \times \tilde{H}_2(\omega)\, F_2(\omega) \quad (5)$$

Figure 2:
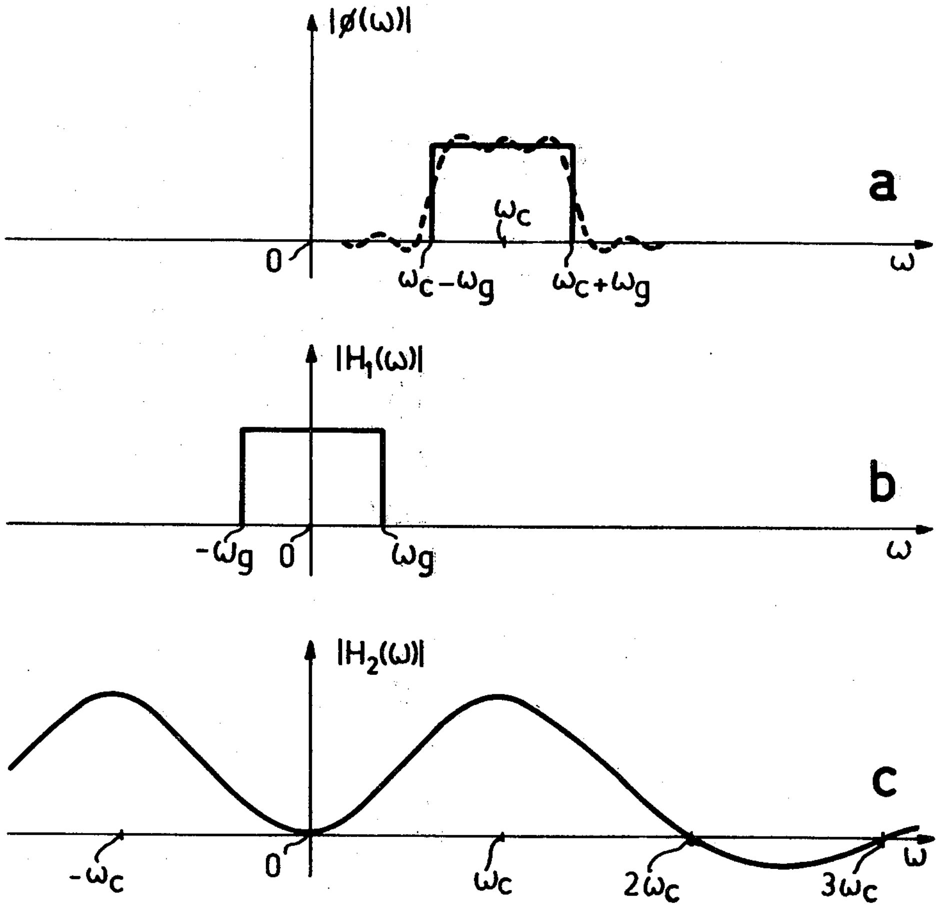
FIG. 2 shows some radial frequency diagrams to explain the operation of the arrangement of FIG. 1.

When the practical task is set of forming the described arrangement for a given modulation method with a given filter characteristic, the coefficients $\alpha_\nu$ and $a_\mu$ can be determined from the associated transfer functions $H_1(\omega)$ and $H_2(\omega)$ with the aid of Fourier expansion while the transfer coefficients $C\,\nu\,\mu$ are laid down because $C\,\nu\,\mu = \alpha_\nu\ a_\mu$. When it is desired, for example, that the carrier pulses from signal source 11 having a carrier frequency $f_c = 1800$ Hz are amplitude-modulated by the binary information pulses from signal source 1 and are filtered in accordance with a rectangular bandpass characteristic having a bandwidth $2f_g = 1200$ Hz as shown at *a* in the radial frequency diagrams of FIG. 2, the equivalent lowpass characteristic of the bandpass characteristic *a* shown at *b* in FIG. 2 is chosen for the transfer function $H_1(\omega)$ associated with the information signal $F_1(\omega)$, while for the transfer function $H_2(\omega)$ associated with the carrier signal $F_2(\omega)$ the function shown at *c* in FIG. 2 is chosen which is given by the relation:

$$H_2(\omega) = \frac{\sin[(\pi/\omega_c)(\omega+\omega_c)]}{(\pi/\omega_c)(\omega+\omega_c)} + \frac{\sin[(\pi/\omega_c)(\omega-\omega_c)]}{(\pi/\omega_c)(\omega-\omega_c)} \quad (6)$$

The coefficients are found with the aid of a Fourier expansion:

$$\alpha_\nu = 2(\omega g/\omega_T)\ si(\nu 2\pi\omega_g\omega_T) \qquad \nu = 0, \pm 1, \pm 2, ---, \pm n \quad (7)$$

in which $si(x)$ is the abbreviated notation for $(\sin x)/x$ and $\omega_g = 2\pi f_g$; likewise, the coefficients $a_\mu$ are found:

$$a = \begin{cases} 2(\omega_c/\omega_\delta)\cos(\mu\, 2\pi\, \omega_c/\omega_\delta) & ,|\mu| < \omega_\delta/2\omega_c \\ (\omega_c/\omega_\delta)\cos(\mu\, 2\pi\, \omega_c/\omega_\delta) & ,|\mu| = \omega_\delta/2\omega_c \\ 0 & ,|\mu| > \omega_\delta/2\omega_c \end{cases} \quad (8)$$

$\mu = 0, \pm 1, \pm 2, ---, \pm m$

When the relation $$\omega_\delta \;/2\omega_c = i \; i = 1, 2, 3, \text{- - -} \quad (9)$$

is satisfied, it is found that the associated Fourier series $$\widetilde{H}_2(\omega) = \sum_{\mu=-1}^{i} a_\mu \exp(-j\,\mu 2\pi\omega/\mu_\delta) \quad (10)$$

for all values of $\omega = k = k\ \omega_c$ ($k$ = integer) is equal to zero with the exception of the values $\omega = \pm(2ik\pm1)\omega_c$ for which the function value is equal to 1. When $i$ is chosen to be equal to, for example, 3, the next harmonic occurs at $\pm 5\ \omega_c$ in addition to the desired carrier frequency at $\pm\omega_c$.

When it is desired to realise the rectangular bandpass characteristic shown at $a$ in FIG. 2 in a reasonable approximation, for example, in accordance with the broken line curve shown at $a$ in FIG. 2, the shift registers 4 and 13 are to have 20 and 6 shift register elements, respectively, and a matrix network 18 having $21 \times 7 =$ 147 modulation elements and 147 associated weighting devices is required.

With an equivalent approximation of the rectangular bandpass characteristic, a considerable reduction in the size of the matrix network 18 is obtained according to the invention in that in the described arrangement a shift register 91 is present with a plurality of shift register elements 92, 93, 94, 95, 96, 97 and with a combination device 98 kocated on its input side which is fed on the one hand by a signal derived from the first signal source 1 and on the other hand by the output signals from weighting devices 99, 100, 101, 102, 103, 104 connected to the elements 92–97 of this shift register 91, the contents of the shift register elements 92–97 being shifted at a frequency which is equal to an integral number of times the shift frequency $f_r$ of the first control generator 3, while the elements 92–97 of this shift register 91 as well as the elements 14–17 of the second shift register 13 are connected to input circuits of modulation elements 106, 107, – 134, 135 incorporated in nodes of a matrix network 105 and having its output circuits connected to weighting devices 136, 137, – 164, 165; 166, while the different weighting devices 55–89; 19 and 136–165; 166 incorporated in a matrix network 18, 105 are connected to a common combination device 168 the output 169 of which constitutes the output of the arrangement.

In the arrangement of FIG. 1, the signal originating from the first signal source 1 is applied to combination device 98 through weighting devices 170, 171, 172, 173, 174, 175, 176 which are connected to the elements 5–10 of the first shift register 4. Furthermore, likewise as in the matrix network 18, the weighting devices connected to the modulation elements 106–135 in the matrix network 105 are also constituted by attenuation networks 136–165 and a combination device 166, an output 167 of which is connected to the common combination device 168, as well as the output 90 of the combination device 19 in matrix network 18. A capacitive shift register is used as a shift register 91 in this case which can process analog signals and likewise semi-analog modulation elements 106–135 are used in matrix network 105 because the input signal from shift register 91 is constituted by an analog signal. Such semi-analog modulation elements are sometimes also referred to as transmission gates or time selection circuits, pass an analog input signal unchanged to their output during time intervals determined by an external control signal (referred to as gating signal or selection signal); beyond these time intervals their output signal is zero. In the embodiment according to FIG. 1 shift register 91 has the same number of elements as shift register 4 and the shift period is likewise equal to the shift period $T_1 = 1/f_T$ of shift register 4.

It is found that by suitable proportioning of the different weighting devices the size of the matrix networks can be reduced to a considerable extent, as will now be explained in greater detail.

When the elements of shift register 91 are enumerated $-n$ to $n$ from the input to the output in the same manner as for shift register 4 and when the transfer coefficients D $\nu_\mu$ from the output of a modulation element in matrix network 105 to output 167 are indicated in the same manner as the transfer coefficients C $\nu\mu$ in matrix network 18, an output signal $$F_{11}(t) = \sum_{\nu=-n+1}^{n} \sum_{\mu=-m}^{m} D\nu_\mu\ f11(t-\nu T_1) f_2(t-\mu T_2) \quad (11)$$

is produced at the output 167 of combination device 166 in case of supply of an input signal $f_{11}(t)$ derived from combination device 98 to shift register 91 and in case of supply of the mentioned signal $f_2(t)$ to shift register 13 provided that also for $f_{11}(t)$ a fictitious zero point in the past is determined which coincides with the center of shift register 91. Assuming that $f_2(t)$ contributes in the same manner to the formation of $F_{11}(t)$ as to that of $F(t)$, the relation $$D\nu_\mu = \beta_\nu\ a_\mu \quad (12)$$

may be introduced in which the coefficients $-\beta_\nu$ and $a_\mu$ represent the contributions of $f_{11}(t)$ and $f_2(t)$, respectively. Application of Fourier transformation to equation (11) leads to the following equation:

$$\phi_{11}(\omega) = -\frac{1}{2\pi} \sum_{\nu=-n+1}^{n} \beta_\nu \exp(-j\nu T_1\omega) F_{11}(\omega) \times \sum_{\mu=-m}^{m} \beta_\mu \exp(-j\mu T_2\omega) F_2(\omega) \quad (13)$$

in which $\phi_{11}(\omega)$, $F_{11}(\omega)$ and $F_2(\omega)$ represent the Fourier transformations of $F_{11}(t)$, $f_{11}(t)$ and $f_2(t)$.

Combination of the signals $F(t)$ and $F_{11}(t)$ according to equations (1) and (11) in combination device 168 results in the output signal from the transmission arrangement $R(t)=F(t)+F_{11}(t)$ at the output 169 whose Fourier transformation R($\omega$) is found by combination of the equations (3) and (13), so that there applies:

$$R(\omega) = \frac{1}{2\pi} \left[ \sum_{\nu=-n}^{n} \alpha_\nu \exp(-j\nu T_1\omega) F_1(\omega) - \sum_{\nu=n+1}^{n} \beta_\nu \exp(-j\nu T_1\omega) F_{11}(\omega) \right] \times \sum_{\mu=-m}^{m} a_\mu \exp(-j_\mu T_2\omega) F_2(\omega) \quad (14)$$

When for the sake of convenience of the equations, the transfer coefficients of weighting devices 170–176 are chosen to be equal to $\alpha_\nu$ and the transfer coefficients of weighting devices 99—104 are chosen to be equal to $-\beta_\nu$, the following relation exists between the signal $f_1(t)$ of signal source 1 and the output signal $f_{11}(t)$ of combination device 98:

$$f_{11}(t+nT_1) = \sum_{\nu=-n}^{n} \alpha_\nu f_1(t-\nu T_1) - \sum_{\nu=-n+1}^{n} \beta_\nu f_{11}(t-\nu T_1) \qquad (15)$$

in which the occurring relative delays resulting from the choice of the fictitious zero points for $f_1(t)$ and $f_{11}(t)$ have been taken into account. After application of Fourier transformation, there follows that:

$$\exp(jnT_1\omega)F_{11}(\omega) = \left[ \sum_{\nu=-n}^{n} \alpha_\nu \exp(-j\nu T_1\omega)F_1(\omega) + - \sum_{\nu=-n+1}^{n} \beta_\nu \exp(-j\nu T_1\omega)F_{11}(\omega) \right] \qquad (16)$$

Introducing the transfer function $H_{11}(\omega)$ and its periodical continuation $\tilde{H}_{11}(\omega)$ by writing equation (16) as $$\exp(jnT_1\omega)F_{11}(\omega) = \tilde{H}_{11}(\omega)\, F_1(\omega) \qquad (17)$$

equation (14), analogous to equation (5), may now be written as $$R(\omega) = \frac{1}{2\pi} \tilde{H}_{11}\omega F_1(\omega) \times \tilde{H}_2(\omega)\, F_2(\omega) \qquad (18)$$

It is found that by this choice of the transfer coefficients of the weighting devices 170–176 and 99–104, the mentioned transfer function $\tilde{H}_2(\omega)$ for the signal $F_2(\omega)$ is realised and for the signal $F_1(\omega)$ the transfer function $\tilde{H}_{11}(\omega)$ given by the equations (16) and (17), from which the following relation can be derived for $\tilde{H}_{11}(\omega)$:

$$\tilde{H}_{11}(\omega) = \frac{\sum_{\nu=-n}^{n} \alpha_\nu \exp(-j\nu T_1\omega)}{1 + \exp(-jnT_1\omega) \cdot \sum_{\nu=-n+1}^{n} \beta_\nu \exp(-j\nu T_1\omega)} \qquad (19)$$

By using the described steps, a transfer function $\tilde{H}_{11}(\omega)$ is thus obtained for the signal $F_1(\omega)$ which has an extra degree of freedom in comparison with the original transfer function $\tilde{H}_1(\omega)$ following from equations (3) and (5):

$$\tilde{H}_1(\omega) = \sum_{\nu=-n}^{n} \alpha_\nu \exp(-j\nu T_1\omega) \qquad (20)$$

As a result of this extra degree of freedom of $\tilde{H}_{11}(\omega)$ according to equation (19), it is possible to realise a desired filter characteristic in the prescribed approximation with a number of terms which is much lower in practice than would be necessary for realising a characteristic with the aid of the original $\tilde{H}_1(\omega)$ according to equation (20). As a result of the occurrence of terms in the denominator of $\tilde{H}_{11}(\omega)$ according to equation (19), it is furthermore possiblee to obtain very steep filter slopes with a comparatively small number of terms so that exactly in those cases in which highly selective filter characteristics are desired, the required number of terms is reduced to an increased extent. As a result thereof, the size of the matrix networks 18 and 105 may then be reduced to a considerable extent. The number of shift register elements of shift register 91 then need not be equal to that of shift register 4.

For example, the rectangular bandpass characteristic shown at *a* in FIG. 2 can be approximated in accordance with the broken line curve, for which purpose shift register 4 then only has to have 2 and shift register 91 only 4 elements while thee transfer function $\tilde{H}_{11}(\omega)$ has the following shape:

$$\tilde{H}_{11}(\omega) = \frac{T_{11}(\omega)}{N_{11}(\omega)} \qquad (21)$$

with $$T_{11}(\omega) = 0{,}1681 \exp(j2T_1\omega) + 0{,}3362 \exp(jT_1\omega) + 0{,}1681 \qquad (21a)$$

and $$N_{11}(\omega) = 1 - 2\exp(-jT_1\omega) + 1{,}82 \exp(-JT_1\omega) + -0{,}82 \exp(-j3T_1\omega) + 0{,}1681 \exp(-j4T_1\omega) \qquad (21b)$$

If shift register 13 likewise as in the foregoing has 6 elements, matrix network 18 then has $3 \times 7 = 21$ modulation elements and matrix network 105 likewise has $4 \times 7 = 28$ modulation elements, so that in the two matrix networks combined only $21 + 28 = 49$ modulation elements and associated weighting devicess are necessary. As has been mentioned before, no fewer than 147 modulation elements with the associated weighting devices are necessary for an equivalent approximation using matrix network 18 exclusively. In this case, the use of the described steps thus results in a reduction by a factor of 3.

In this case, it is to be noted that for the transfer coefficients of the weighting devices 170–176 and 99–104 other values than $\alpha_\nu$ and $-\beta_\nu$ may be used, but these other values result in an output signal of the transmission arrangement having a much more intricated structure, so that for the sake of convenience the choice already mentioned is preferred. Furthermore, it is to be noted that shift register 91 may not only be formed as a capacitive shift register but also as a single or multiple digital shift register having an analog-to-digital converter connected to its input and digital-to-analog converters connected to the outputs of the shift register elements such as are described, for example, in Netherlands patent application No. 6602900. It is also possible to choose an integral multiple of the shift frequency $f_r$ of shift register 4 for the shift frequency of shift register 91; in that case also the transfer coefficients of the weighting devices are to be adapted to this choice.

Figure 3:
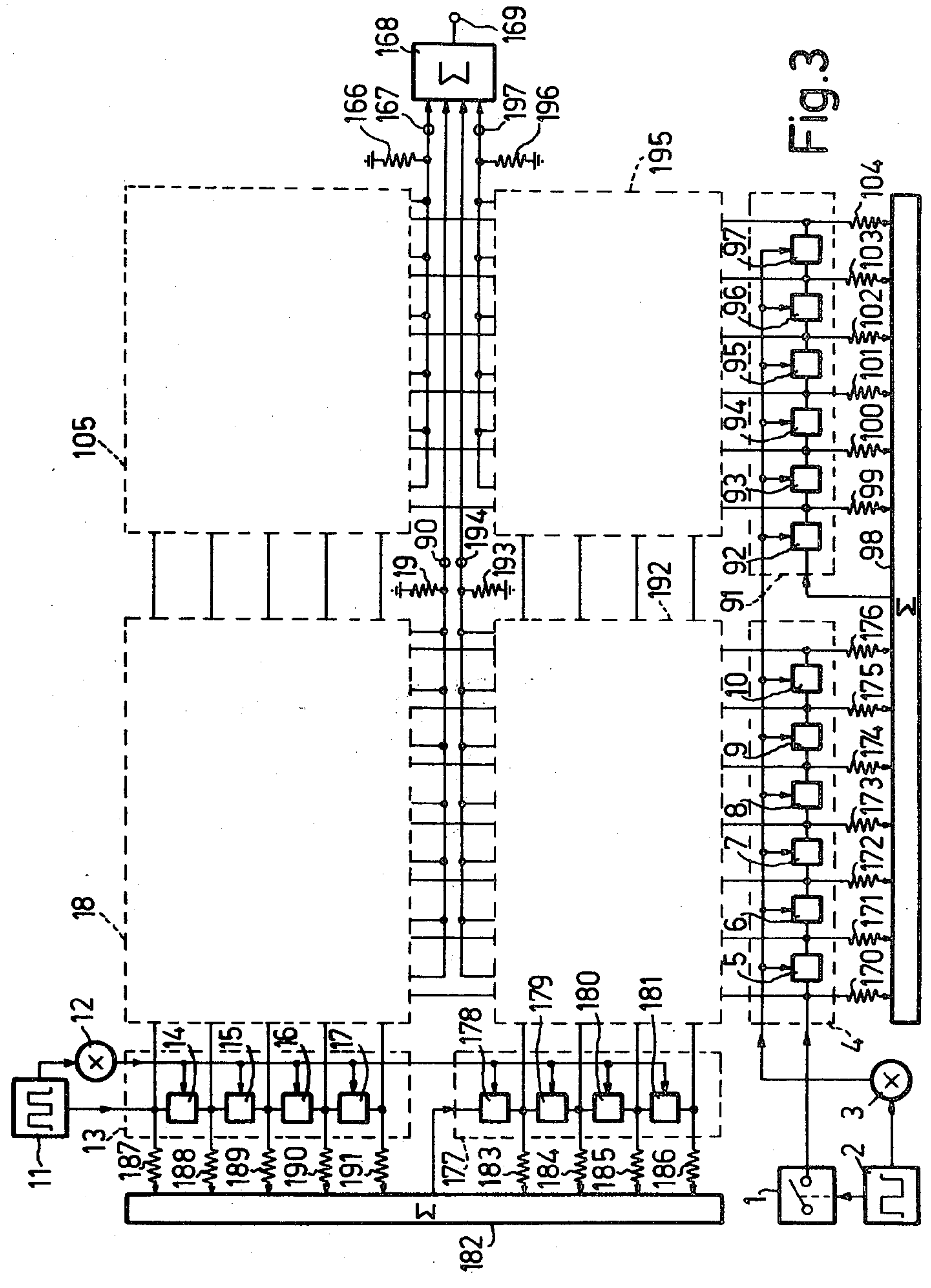
FIG. 3 shows aa modification of the arrangement of FIG. 1.

FIG. 3 shows a modification of the transmission arrangement shown in FIG. 1, the corresponding elements of the two Figures having the same reference numerals.

The arrangement of FIG. 3 differs from that of FIG. 1 in that in FIG. 3 the carrier pulses from the second signal source 11 are also subjected to a similar operation as the information pulses from the first signal source 1. To this end, the arrangement of FIG. 3 includes a shift register 177 having a plurality of shift register elements 178, 179, 180, 181 and a combination device 182 located on its input side which device is fed on the one hand by a signal derived from the second signal source 11 and on the other hand by the output signals from weighting devices 183, 184, 185, 186 connected to the elements 178–181 of shift register 177, the contents of this shift register 177 being shifted at the shift frequency $f_\delta$ of the second control generator 12. Also in this case the signal originating from the second signal source 11 is applied to combination device 182 through weighting devices 187, 188, 189, 190, 191 connected to the elements 14–17 of the second shift register 13. Likewise as in the matrix network 105, the elements 178–181 of shift register 177 and the elements 5–10 of the first shift register 4 are connected to a matrix network 192 whose nodes incorporate modulation elements whose outputs are connected through weighting devices to a combination device 193. Furthermore, the elements 178–181 of this shift register 177 and the elements 92–97 of the shift register 91 are connected to a matrix network 195 whose nodes incorporate modulation elements whose outputs are connected through weighting devices to a combination device 196. The outputs 194, 197 of the combination devices 193, 196 in the matrix networks 192, 195 are connected to the common combination device 168. Shift register 177, likewise as shift register 91, is a capacitive shift register which can process analog signals. Likewise in the matrix network 192 the same semianalog modulation elements as in matrix network 105 are used because the input signal from shift register 177 is constituted by an analog signal while in matrix network 195 full analog modulation elements (multipliers) are used because the input signals from the shift registers 91 and 177 are both formed by analog signals.

Similarly as in the foregoing, it can be derived how the matrix networks 192, 195 contribute to the formation of the ultimate signal at output 169 of the transmission arrangement. To this end, the elements of shift register 177 are enumerated -m to m in the same manner as for shift register 13; likewise, the transfer coefficients P $\nu\mu$ in matrix network 192 and Q $\nu\mu$ in matrix network 195 are indicated in thee same manner as the mentioned transfer coefficients C$\nu\mu$ and D $\nu_\mu$ in matrix networks 18 and 105. Furthermore, it is assumed that the signal $f_1(t)$ applied to shift register 4 in matrix networks 18 and 192 contributes in the same manner to the formation of the respective signals at outputs 90 and 194, while the same assumption is made for the contribution of the signal $f_{11}(t)$ applied to shift register 91 in matrix networks 105 nd 195 for forming the respective signals at outputs 167 and 197. Likewise it is assumed that the signal $f_{22}(t)$ derived from combination device 182 and applied to shift register 177 in matrix networks 192 and 195 contributes in the same manner to the formation of the respective signals at outputs 194 and 197.

In this case, the following relations can be written for the transfer coefficients P $\nu\mu$ and Q $\nu\mu$ $$P\,\nu\mu = (\alpha_\nu)(-b_\mu) = -\alpha_\nu\, b_\mu \qquad (22)$$

$$Q\,\nu\mu = (-\beta_\nu)(-b_\mu) = \beta_\nu\, b_\mu$$

inn which the coefficients $\alpha_\nu$ and $-\beta_\nu$ already mentioned hereinbefore represent the contributions of $f_1(t)$ and $f_{11}(t)$, respectivekly, and the coefficients $-b_\mu$ represent the contribution of $f_{22}(t)$. The overall contribution S($t$) of matrix networks 192 and 195 to the ultimate signal at output 169 then depends in the same manner on $f_{22}(t)$ as the mentioned overall contribution R($t$) of matrix networks 18 and 105 depends on $f_2(t)$. If The Fourier transformation R($\omega$) of R($t$) given in equation (14) is written with the aid of equations (16) and (17) as $$R(\omega) = \frac{1}{2\pi}\tilde{H}_{11}(\omega)F_1(\omega) \times \sum_{\mu=-m}^{m} a_\mu \exp(-j\mu T_2\omega)F_2(\omega) \qquad (23)$$

the Fourier transformation S($\omega$) of S($t$) may be written analogously as $$S(\omega) = \frac{1}{2\pi}\tilde{H}_{11}(\omega) \times \sum_{\mu=-m+1}^{m} b_\mu \exp(-j\mu T_2\omega)F_{22}(\omega) \qquad (24)$$

A similar relationship then exists between the signals $F_2(\omega)$ and $F_{22}(\omega)$ as between the signals $F_1(\omega)$ and $F_{11}(\omega)$. When the transfer coefficients of weighting devices 187–191 and 183–186 are chosen to be equal to $a_\mu$ and $-b_\mu$, respectively, it is possible to write analogously to equation (16)

$$\exp(jmT_2\omega)F_{22}(\omega) = \sum_{\mu=-m}^{m} a_\mu \exp(-j\mu T_2\omega)F_2(\omega) + - \sum_{\mu=m+1}^{m} b_\mu \exp(-j_\mu T_2\omega)F_{22}(\omega) \qquad (25)$$

By writing this equation as $$\exp(jmT_2\omega)F_{22}(\omega) = \tilde{H}_{22}(\omega)\, F_2(\omega)$$

the transfer function $H_{22}(\omega)$ and its speriodical continuation $\tilde{H}_{22}(\omega)$ are introduced.

The ultimate signal U($t$) = R($t$) at output 169 of the transmission arrangement of FIG. 3 then has a Fourier transformation U($\omega$) which is found by combination of equations (23) and (24) and which can be written with the aid of equations (25) and (26) analogously to equation (18) as $$U(\omega) = \frac{1}{2\pi}\tilde{H}_{11}(\omega)F_1(\omega) \times \tilde{H}_{22}(\omega)F_2(\omega) \quad (27)$$

It is found that for the signal $F_1(\omega)$, the transfer function $\tilde{H}_{11}(\omega)$ given in equation (19) is realised and for the signal $F_2(\omega)$ the transfer function $\tilde{H}_{22}(\omega)$ is realised, while it can be derived from equations (25) and (26) that:

$$\tilde{H}_{22}(\omega) = \frac{\sum_{\mu=-m}^{m} a_\mu \exp(-j\mu T_2\omega)}{1 + \exp(-jmT_2\omega) \cdot \sum_{\mu=-m+1}^{m} b_\mu \exp(-j\mu T_2\omega)} \quad (28)$$

On account of exactly the same considerations as for the transfer function $\tilde{H}_{11}(\omega)$, the transfer function $\tilde{H}_{22}(\omega)$ thus obtained makes a further reduction of the number of modulation elements and associated weighting devices required for matrix networks 18, 105, 192, 195 possible.

Figure 4:
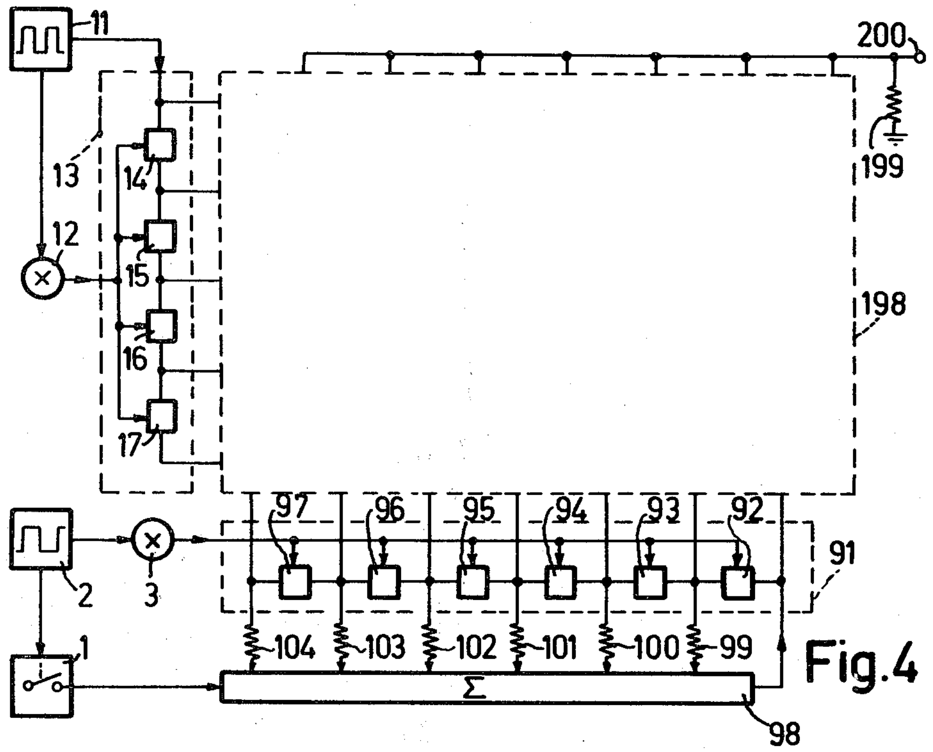
FIGS. 4 and 5 show modifications of the arrangements of FIGS. 1 and 3 having a simpler structure.
Figure 5:
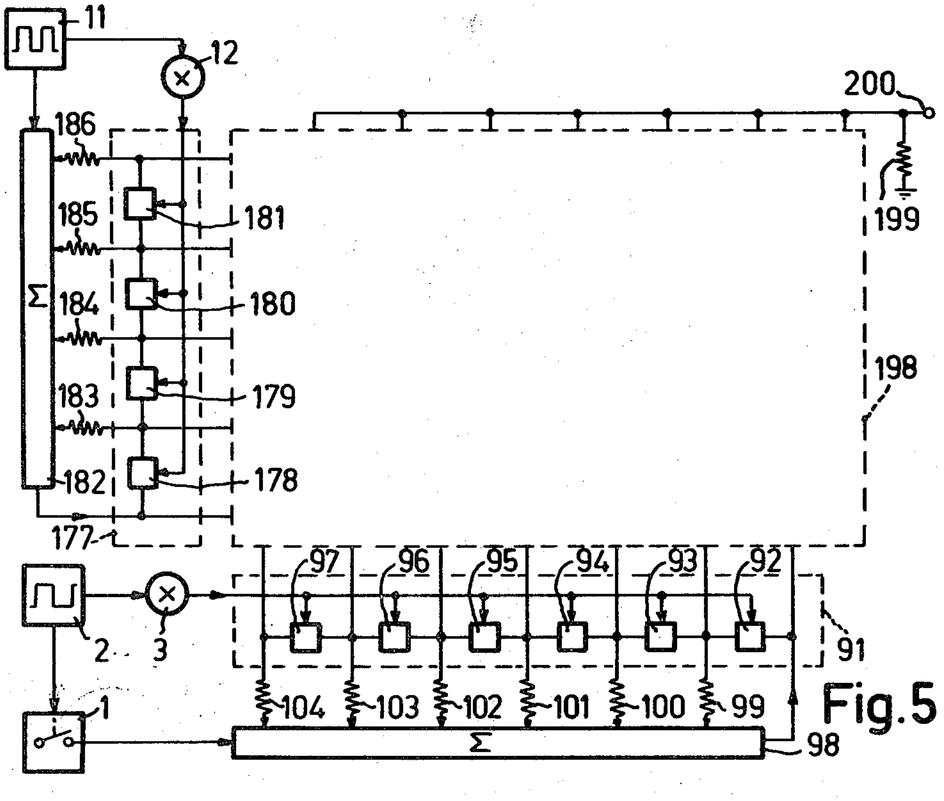

Further studies of the transmission arrangements of FIG. 1 and FIG. 3 have proved that their structure can be simplified further by combining the functions of the matrix networks in the manner shown in FIGS. 4 and 5. This simplification results in addition in a considerable extra economy in the number of modulation elements and associated weighting devices.

FIG. 4 shows a modification of the transmission arrangement of FIG. 1 in which corresponding elements have the same reference numerals. The arrangement of FIG. 4 differs from that of FIG. 1 in that the two matrix networks 18 and 105 in FIG. 1 are combined into one matrix network 198 of modulation elements to which in this case the output circuits of shift registers 13 and 91 are connected. The structure of this matrix network 198 corresponds to that of matrix networks 18 and 105, in which semi-analog modulation elements are used in connection with the analog input signal of shift register 91. A further difference from FIG. 1 is that the signal of the first signal source 1 is directly applied to combination device 98 while omitting shift register 4 and the weighting devices 170–176 connected threto in FIG. 1.

Entirely in the same manner as for the arrangements of FIG. 1 and FIG. 3, the output signal from the arrangement of FIG. 4 can be calculated. Surprisingly, exactly the same output signal as that at output 169 of the common combination device 168 of FIG. 1 is found to occur at the output 200 of combination device 199 of matrix network 198 in FIG. 4 if the transfer coefficients of the weighting devices in matrix network 198 are rendered equal to those of matrix network 18 in FIG. 1, thus to $C\nu\mu = \alpha_\nu\ a_\mu$. The modulation and filtering process in the arrangement of FIG. 4 is thus likewise represented by equation (18) which is derived for the arrangement of FIG. 1.

By combination of the functions of the matrix networks 18 and 105, a considerable further reduction in the required number of modulation elements and weighting devices is realised in the arrangement of FIG. 4 as compared with the arrangement of FIG. 1. For the purpose of realising exactly the same approximation of the rectanfular bandpass characteristic shown at *a* in FIG. 2, the shift registers 91 and 13 of FIG. 4 need only have 6 and 4 elements, respectively, likewise as in FIG. 1. In this case, however, only one matrix network 198 is required for this purpose which has as many modulation elements and associated weighting devices as has matrix network 18 in FIG. 1 hence 3 × 7 = 21. As already noted, 147 modulation elements and associated weighting devices would be necessary without using the steps according to the invention for an equivalent approximation, so that in the arrangement of FIG. 4 a reduction by a factor of 7 is realised. As compared with the arrangement of FIG. 1 in which a reduction by a factor 3 is realised, a considerable extra economy is thus obtained in the arrangement of FIG. 4.

FIG. 5 shows a modification of the arrangement of FIG. 3 which is obtained in the same manner as the arrangement of FIG. 4 by combining the functions of the matrix networks. The 4 matrix networks 18, 105, 192, 195 of FIG. 3 are now combined into one matrix network 198 of modulation elements to which the output circuits of the shift registers 177 and 91 are connected As in FIG. 4, the signal from the first signal source 1 is directly applied to combination device 98 in FIG. 5, but in addition the signal from the second signal source 11 in FIG. 4 is directly applied to combination device 182. Also in this case the output signal at output 200 can be calculated in the manner already extensively described, in which it is also surprisingly found that this output signal is equal to that in the arrangement of FIG. 3 if the transfer coefficients in matrix network 198 are made again equal to those in matrix network 18 in FIG. 3, hence to $C\nu\mu = \alpha_\nu\ a_\mu$. Thus, in this case, the modulation and filtering process is represented by the equation (27) which is derived for FIG. 3. On the same grounds as for the arrangement of FIG. 4, a considerably larger economy in modulation elements and associated weighting devices is achieved in the arrangement of FIG. 5 as compared with the arrangement of FIG. 3.

What is claimed is:

1. Apparatus for the transmission of information comprising a first signal source; a second signal source; a first control generator for providing shift pulses; a second control generator for providing further shift pulses; a first shift register connected to said first control generator and having a plurality of shift register elements; a second shift register; means connecting said second shift register to the second signal source and to the second control generator, said second shift register having a plurality of shift register elements whoe contents are shifted at the frequency of the second control generator; a matrix network provided with input circuits, output circuits and nodes; a plurality of modulation elements incorporated in the nodes of said matrix network; means connecting the input circuits of said matrix network to the shift register elements of the first shift register and to the shift register elements of the second shift register; a first plurality of weighting devices; means connecting the output circuits of said matrix network to said first plurality of weighting devices, a first combination device; means connecting an output of the first combination device to an input of said first shift register; means connecting an output of said first signal source to a further input of said first combination device; a second plurality of weighting devices connecting shift register element outputs of said first shift register to further inputs of said first combination device; means for shifting said first shift register at a frequency equal to an integral multiple of the frequency of said first control generator; a second combination device connected to the first plurality of weighting devices in said matrix network and providing an output of said apparatus.

2. Apparatus as recited in claim 1, further comprising a third shift register connected to said first signal source and to said first control generator; said third shift register comprising shift register elements who's contents are shifted at an integral multiple of the frequency of the first control generator; a second matrix network provided with input circuits, output circuits and a plurality of nodes; a plurality of second modulation elements incorporated in the nodes of said second matrix network; means connecting the input circuits of said second matrix network to the shift register elements of said second shift register and to the shift register elements of the third shift register; a third plurality of weighting devices connecting said elements of said third shift register to said first combination device; a third combination device having a first input connected to said second combination device; and a fourth plurality of weighting elements connecting the modulation elements of said second matrix network to a second input of said third combination device, an output of said third combination device providing a further output of said apparatus.

3. Apparatus as recited in claim 1, wherein said means connecting said second shift register to said second signal source comprises a third combination device, a third plurality of weighting devices connecting outputs of said second shift register to said third combination device, means connecting said second signal source to said third combination device, and means connecting an output of said third combination device to an input of said second shift register.

4. Apparatus as recited in claim 1, wherein said means connecting said input circuits of said matrix network to said first and second shift register comprises a second matrix network connected to said second shift register elements and a third matrix network connected to said first shift register elements; said apparatus further comprising a third shift register connected to said second control generator and havving a plurality of shift register elements shifted at the frequency of said second control generator; a third combination device; a third plurality of weighting elements connecting said shift register elements of said third shift register to said third combination device, an output of said third combination device being connected to an input of said thrid shift register; a fourth plurality of weighting elements connecting outputs of said shift register elements of said second shift register to inputs of said third combination device; a fourth shift register connected to said first signal source and to said first control generator and having a plurality of shift register elements whose contents are shifted at an integral multiple of the frequency of said first control generator; a fifth plurality of weighting devices connecting outputs of said shift register elements of said fourth shift register to inputs of said first combination device; a fourth matrix network having inputs connected to shift register elements of said third and fourth shift registers; a fifth combination device means connecting outputs of all the matrix networks to the fifth combination device, an output of said fifth combination device providing a further output of said apparatus.

* * * * *

UNITED STATES PATENT AND TRADEMARK OFFICE
CERTIFICATE OF CORRECTION

PATENT NO. : 3,904,965

DATED : September 9, 1975

INVENTOR(S) : PETER EUGEN LEUTHOLD

It is certified that error appears in the above-identified patent and that said Letters Patent are hereby corrected as shown below:

IN THE SPECIFICATION

Col. 1, line 51, "special" should be --spectral--;

Col. 3, line 65, in equation (2), "xexp" should be --*exp--;

Col. 4, line 7, in equation (3), "($\omega$)x" should be --($\omega$)*--;

line 19, "=2$\tau\pi$ f$\tau$" should be -- =2$\pi$f$\tau$ --;

line 24, in equation (5) "x" should be --*--;

line 60, "a" should be --$a_\mu$--;

Col. 5, line 11, "$\omega$=k = k$\omega_c$" should be --$\omega$=k$\omega_c$--;

line 31, "kocated" should be --located--;

Col. 6, line 50, in equation (13) "($\omega$)x" should be --($\omega$)*--; and "$\beta_\mu$" should be --$a_\mu$--;

line 66, in equation (14) "]x" should be --]*--;

Col. 7, line 39, in equation (18) "$\tilde{H}_{11}\omega$" should be --$\tilde{H}_{11}(\omega)$--; also "x" should be --*--;

UNITED STATES PATENT AND TRADEMARK OFFICE

CERTIFICATE OF CORRECTION

PATENT NO. : 3,904,965

DATED : September 9, 1975

INVENTOR(S) : PETER EUGEN LEUTHOLD

It is certified that error appears in the above-identified patent and that said Letters Patent are hereby corrected as shown below:

Col. 7, line 41, "It is found" should start a new paragraph;

Col. 8, line 14, "possiblee" should be --possible--;

line 27, "thee" should be --the--;

line 41, in equation (21b) "$(-JT_1\omega)$" should be --$(-jT_1\omega)$--;

line 50, "devicess" should be --devices--;

Col. 10, line 3, "thee" should be --the--;

line 11, "nd" should be --and--;

line 23, "inn" should be --in--;

line 25, "respectivekly" should be --respectively--;

line 37, in equation (23) "$(\omega)x$" should be --$(\omega)^*$--;

line 45, equation (24) should read --

$$S(\omega) = \frac{1}{2\pi}\tilde{H}_{11}(\omega)F_1(\omega) * \sum_{\mu=-m+1}^{m} b_\mu \exp(-j\mu T_2\omega) F_{22}(\omega)$$

--;

UNITED STATES PATENT AND TRADEMARK OFFICE
CERTIFICATE OF CORRECTION

PATENT NO. : 3,904,965

DATED : September 9, 1975

INVENTOR(S) : PETER EUGEN LEUTHOLD

It is certified that error appears in the above-identified patent and that said Letters Patent are hereby corrected as shown below:

Col. 10, line 63, "speriodical" should be --periodical--;

Col. 11, line 5, in equation (27) "x" should be --*--;

Col. 12, line 20, after "connected" insert --.--(a period);

IN THE CLAIMS

Claim 1, line 10, "whoe" should be --whose--;

Claim 4, line 28, after "device" insert -- , --(a comma).

Signed and Sealed this

*twenty-fifth* Day of *November 1975*

[SEAL]

*Attest:*

RUTH C. MASON
*Attesting Officer*

C. MARSHALL DANN
*Commissioner of Patents and Trademarks*